(12) United States Patent
Okumura et al.

(10) Patent No.: US 11,438,505 B2
(45) Date of Patent: Sep. 6, 2022

(54) IMAGING APPARATUS AND CONTROL METHOD

(71) Applicant: CANON KABUSHIKI KAISHA, Tokyo (JP)

(72) Inventors: Naoto Okumura, Kanagawa (JP); Takumi Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/380,770

(22) Filed: Jul. 20, 2021

(65) Prior Publication Data
US 2022/0030166 A1   Jan. 27, 2022

(30) Foreign Application Priority Data
Jul. 27, 2020   (JP) .............................. JP2020-126318

(51) Int. Cl.
*H04N 5/232*   (2006.01)

(52) U.S. Cl.
CPC ..... *H04N 5/23238* (2013.01); *H04N 5/23218* (2018.08); *H04N 5/23222* (2013.01); *H04N 5/23227* (2018.08)

(58) Field of Classification Search
CPC ........... H04N 5/23227; H04N 5/23218; H04N 5/23222; H04N 5/23238; H04N 5/23219; H04N 5/23206; B64C 2201/127; B64C 39/024

USPC .................................................. 348/143–160
See application file for complete search history.

(56) References Cited

U.S. PATENT DOCUMENTS 10,880,465 B1 * 12/2020 Svendsen ........... H04N 5/23219

FOREIGN PATENT DOCUMENTS

| JP | 2008-252494 A | 10/2008 |
| JP | 2011-101165 A | 5/2011 |
| JP | 4757832 B2 | 8/2011 |

* cited by examiner

*Primary Examiner* — Xi Wang
(74) *Attorney, Agent, or Firm* — Cowan, Liebowitz & Latman, P.C.

(57) ABSTRACT

An imaging apparatus includes a communication unit, a movement unit, an imaging unit, and a control unit. The communication unit receives first information including information on a shooting position of an external apparatus. The movement unit moves the imaging apparatus to a position at which a bird's eye view of subjects is made possible. The imaging unit performs shooting at the position at which the bird's eye view of the subject is made possible. The control unit acquires second information on the subjects from an image that is shot at the position at which the bird's eye view of the subject is made possible, determines priority for shooting each of the subjects based on the first information and the second information, and controls the movement unit and the imaging unit based on the determined priority.

13 Claims, 9 Drawing Sheets

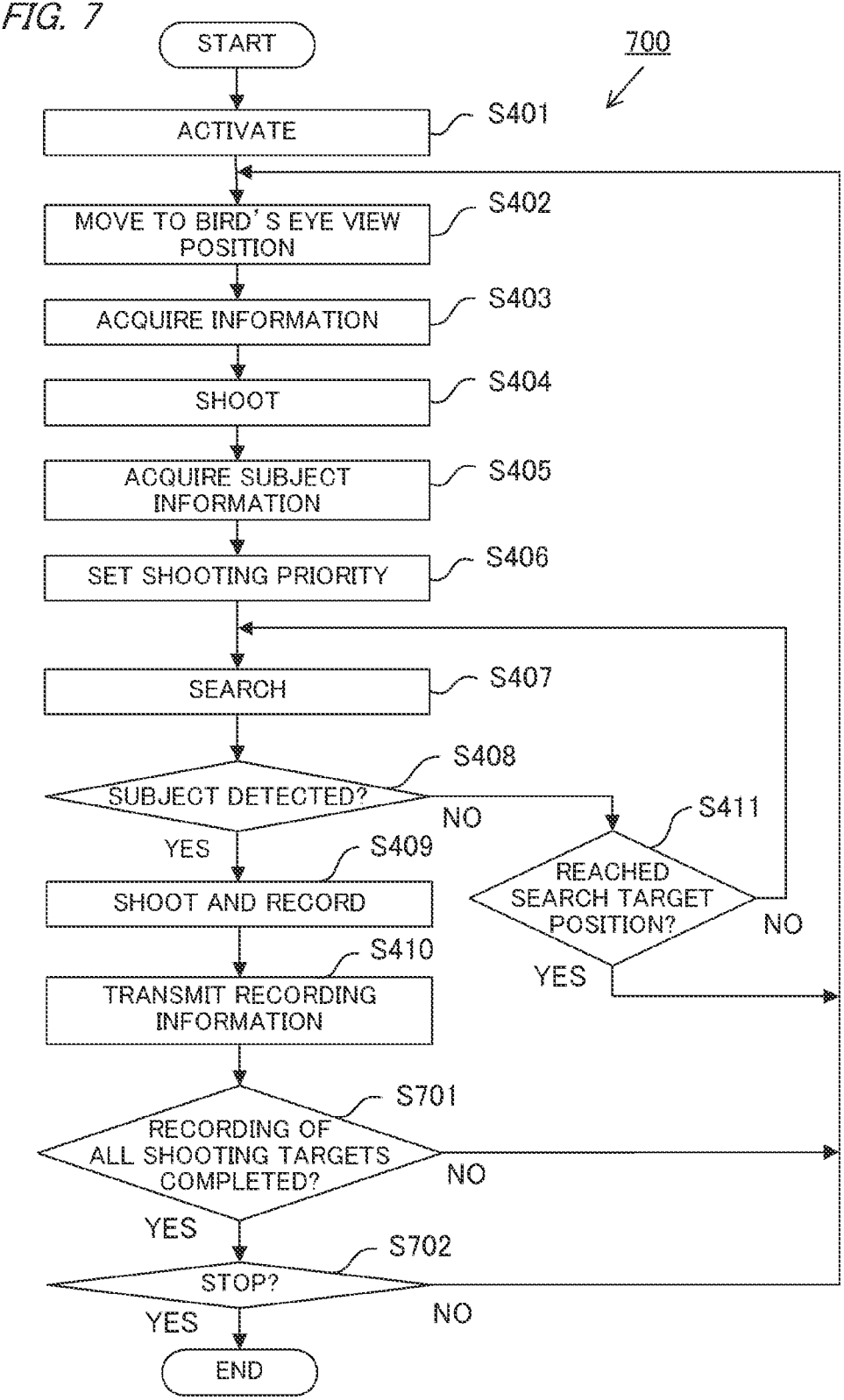

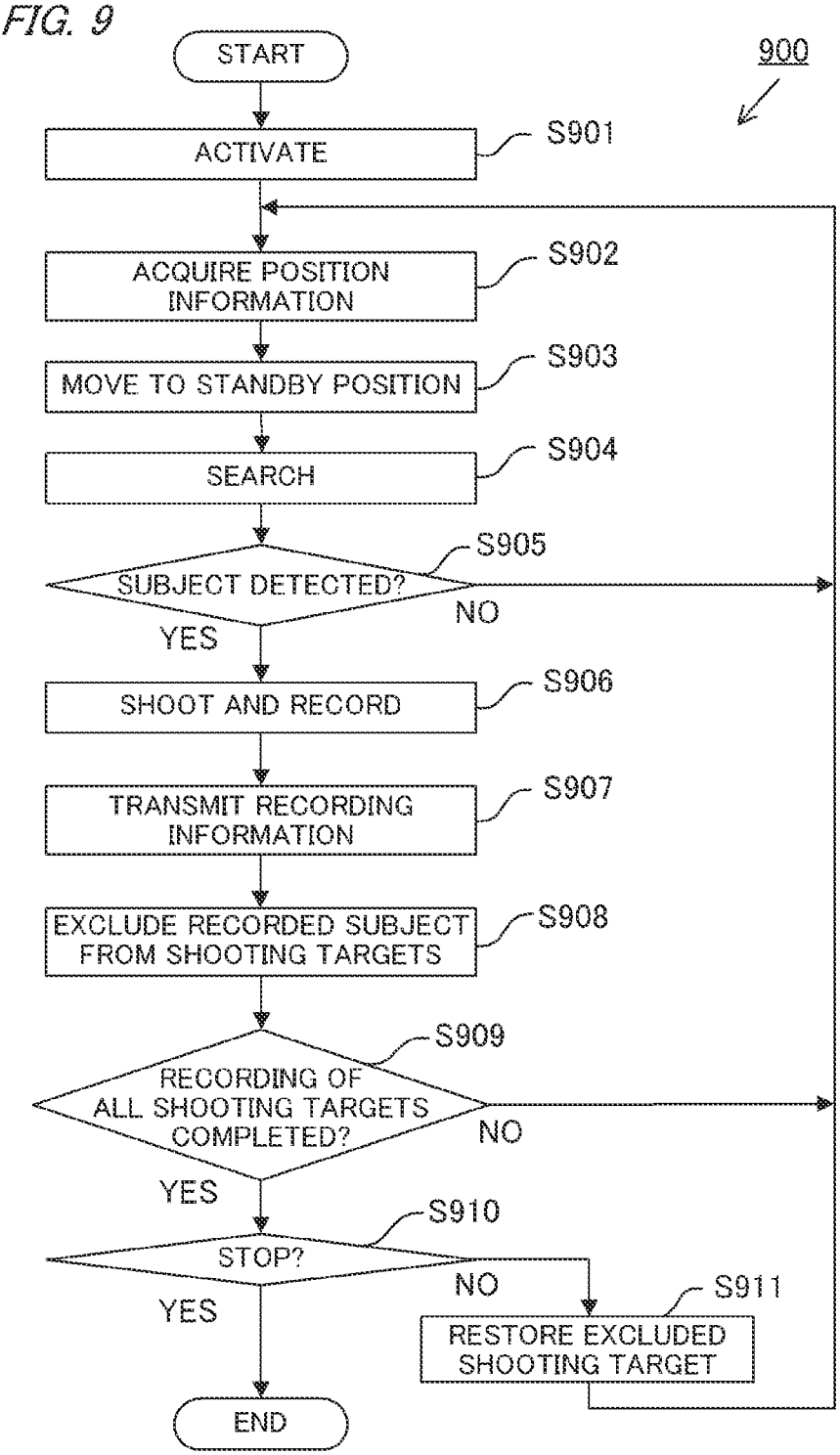

IMAGING APPARATUS AND CONTROL METHOD

BACKGROUND

Field of the Disclosure

Aspects of the disclosure generally relate to an imaging apparatus and a method for controlling the imaging apparatus.

Description of the Related Art

Imaging systems that shoot images of subjects using cameras have been known. In such imaging systems, persons generally manually perform the posture control, shooting control, and confirmation of recording data of respective cameras. However, in a case where it is desired that images of all target subjects be shot within a limited time, the persons have limitations in manually controlling the respective cameras and confirming the recording data. In order to address such a problem, shooting systems in which cameras share information with each other and cooperate with each other to automatically shoot subjects have been known.

Japanese Patent Application Laid-open No. 2011-101165 discloses a technology in which a subject of a sub camera is determined based on information on a position shot by a main camera to implement simultaneous shooting of different subjects by the cameras. Japanese Patent No. 4757832 discloses a technology in which composition and a shooting order for shooting a subject are set in a camera and a user is urged to perform shooting again in a case where a shooting image does not match a shooting instruction image to efficiently shoot a desired image without excess and deficiency.

However, in the shooting system of Japanese Patent Application Laid-open No. 2011-101165, the sub camera has a difficulty in searching for a subject when the main camera loses sight of a subject, since a shooting target of the sub camera is determined based on subject information detected by the main camera. In addition, the sub camera is controlled to follow a subject close to a subject of the main camera and does not simultaneously shoot subjects existing in a wide range.

In the shooting system of Japanese Patent No. 4757832, a shooting subject, composition, and a shooting order are set in advance. Therefore, when a subject moves fast or when a situation irregularly changes with a lapse of time, it is sometimes difficult to perform shooting as planned.

SUMMARY

According to various embodiments, an imaging apparatus and a method capable of comprehensively shooting subjects, which are shooting targets, are provided.

According to various embodiments, there is provided an imaging apparatus that includes: a communication unit that receives first information including information on a shooting position of an external apparatus; a movement unit that moves the imaging apparatus to a position at which a bird's eye view of subjects is made possible; an imaging unit that performs shooting at the position at which the bird's eye view of the subject is made possible; and a control unit that (a) acquires second information on the subjects from an image that is shot at the position at which the bird's eye view of the subject is made possible, (b) determines priority for shooting each of the subjects based on the first information and the second information, and (c) controls the movement unit and the imaging unit based on the determined priority.

According to various embodiments, there is provided a control method that includes: receiving first information including information on a shooting position of an external apparatus; causing a movement unit of an imaging apparatus to move the imaging apparatus to a position at which a bird's eye view of subjects is made possible; causing an imaging unit of the imaging apparatus to perform shooting at the position at which the bird's eye view of the subject is made possible; acquiring second information on the subjects from an image that is shot at the position at which the bird's eye view of the subject is made possible; determining priority for shooting each of the subjects based on the first information and the second information; and controlling the movement unit and the imaging unit based on the determined priority.

Further aspects of the disclosure will become apparent from the following description of exemplary embodiments.

BRIEF DESCRIPTION OF THE DRAWINGS

FIG. 7 is a flowchart for exemplifying a shooting process of a drone according to a second embodiment;

FIG. 9 is a flowchart for exemplifying a shooting process of the drone according to the third embodiment.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

A first embodiment relates to an imaging system in which an unmanned imaging apparatus comprehensively shoots subjects that are shooting targets in cooperation with another imaging apparatus. The unmanned imaging apparatus acquires information on subjects that are shooting targets, recording information as to whether the subjects have been shot, information on a region that has been shot by the other imaging apparatus, or the like from the other imaging apparatus and sets shooting priority in shooting the subjects that are the shooting targets. The unmanned imaging apparatus is capable of comprehensively shooting the subjects that are the shooting targets by shooting the subjects according to the set shooting priority.

The unmanned imaging apparatus is, for example, a camera integrated drone including an imaging unit capable of changing an angle of view, includes a movement unit for at least any of taxiing and an aerial flight and is capable of performing unmanned movement. The unmanned imaging apparatus will be hereinafter called a drone. The other imaging apparatus is, for example, a camera that is manually operated by a user to perform shooting while confirming shooting targets and will be hereinafter called a hand-held camera. Note that the other imaging apparatus is not limited to the hand-held camera but includes a camera that is installed on a tripod, a camera that performs shooting through a remote operation, or the like. Furthermore, the other imaging apparatus is capable of transmitting and receiving various information to and from the unmanned imaging apparatus and may be a drone including an imaging unit like the unmanned imaging apparatus.

In the first embodiment, a drone shoots subjects in which shooting priority is set in order. When the shooting of the subjects in which the shooting priority is set is completed or when a subject having the highest shooting priority is not detected, the drone resets the shooting priority of the subjects. The drone is capable of reducing the number of times to reset the shooting priority and efficiently shooting subjects that have not been shot.

Figure 1A:
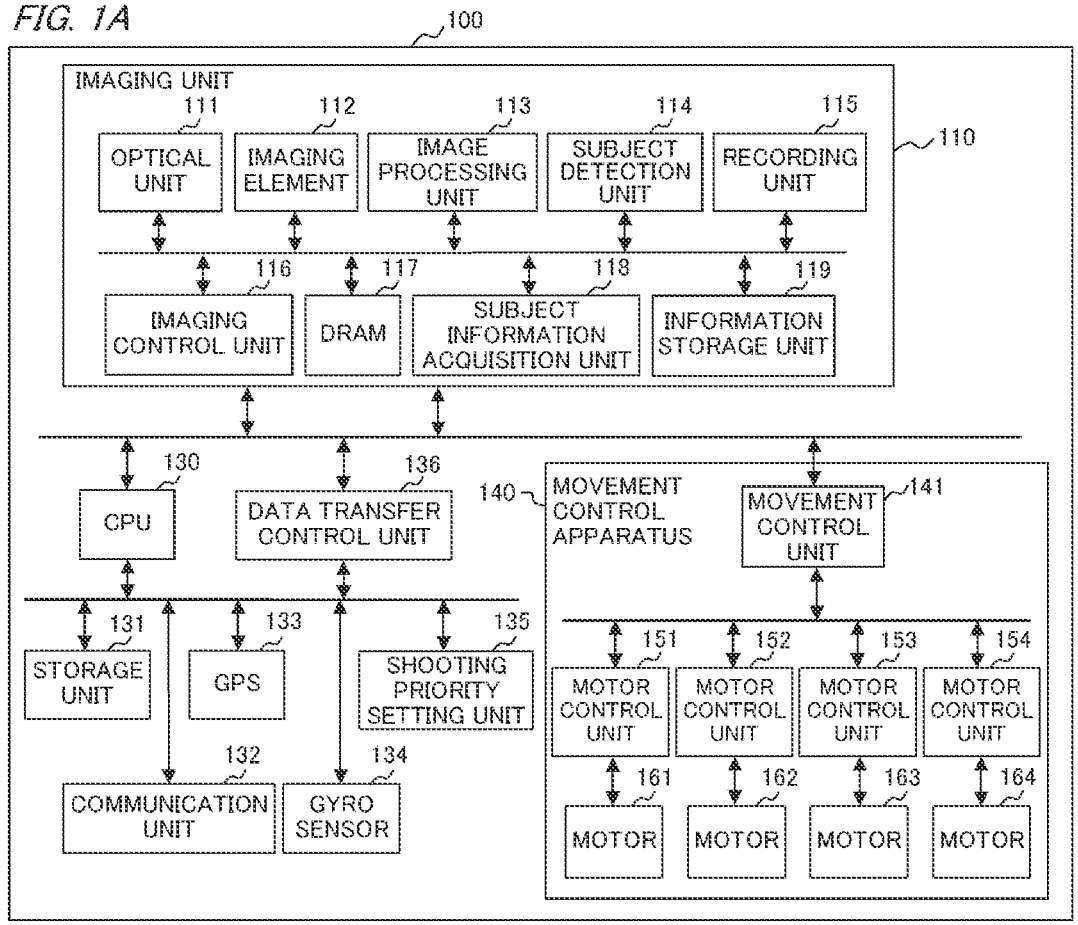
FIGS. 1A and 1B are block diagrams for exemplifying configurations of a drone and a hand-held camera.
Figure 1B:
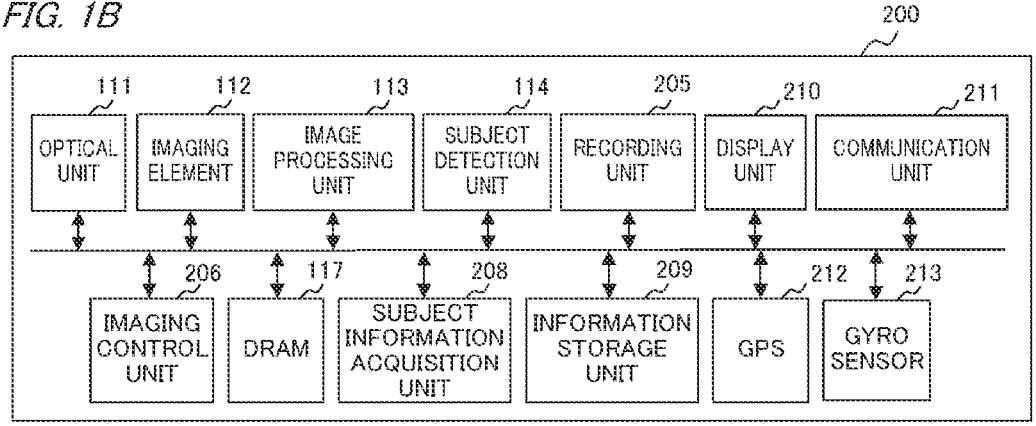

FIGS. 1A and 1B are block diagrams for exemplifying configurations of a drone 100 and a hand-held camera 200. FIG. 1A exemplifies the configuration of the drone 100. FIG. 1B exemplifies the configuration of the hand-held camera 200.

The configuration of the drone 100 will be described with reference to FIG. 1A. A CPU 130 is a processor that is responsible for controlling the whole drone 100. A storage unit 131 stores a program capable of being performed by the CPU 130. A communication unit 132 transmits various information to the other imaging apparatus (hand-held camera) 200 and receives various information from the other imaging apparatus (hand-held camera) 200.

A data transfer control unit 136 controls data transfer between a communication unit 132 and a shooting priority setting unit 135 based on instructions from the CPU 130. A GPS (Global Positioning System) 133 measures the position of the drone 100 and acquires coordinate information. A gyro sensor 134 detects the angular speed of the drone 100 and detects a change in direction. The shooting priority setting unit 135 sets shooting priority in shooting a subject that is a shooting target.

A movement control apparatus 140 includes a movement control unit 141, motor control units 151 to 154, and motors 161 to 164. The motors 161 to 164 are connected to rotor blades 101 to 104 shown in FIG. 2, respectively. The drone 100 causes the four rotor blades 101 to 104 to rotate independently and in a balanced manner with respective motors to realize a flight.

The movement control unit 141 includes a processor that controls processes performed in the components of the movement control apparatus 140. The movement control unit 141 controls the flight of the drone 100 according to instructions from the CPU 130 based on information detected by the gyro sensor 134.

An imaging unit 110 shoots a subject based on shooting priority according to instructions from the CPU 130. An imaging control unit 116 includes a processor that controls processes performed in the imaging unit 110. The imaging control unit 116 is capable of controlling a change in an angle of view according to, for example, the position or altitude of the drone 100 with respect to a shooting range. An optical unit 111 includes a lens, an aperture, and the like, and performs focus adjustment and exposure adjustment. An imaging element 112 is a CCD or the like that converts an optical image into an electric signal. An image processing unit 113 applies various image processes such as a noise reduction process to captured image data. A DRAM (Dynamic Random Access Memory) 117 is a memory for temporarily storing image data.

A subject detection unit 114 detects a shooting target subject registered in advance from an input image. The subject detection unit 114 detects a subject and acquires various information on the subject such as the direction of a face, the size of the face, and the position of the face on an imaging screen. The subject detection unit 114 is capable of detecting a subject from an image captured by the drone 100 and an image captured by the hand-held camera 200 that is received via the communication unit 132. A recording unit 115 records an image or the like captured by the drone 100 on a recording medium.

A subject information acquisition unit 118 acquires subject information. The subject information includes information on a distance between the drone 100 and a subject, information on the position of the subject, and information on surrounding subjects. Specifically, the subject information acquisition unit 118 calculates a distance between the drone 100 and a subject from information on an image captured by the drone 100 and the detection result of the subject detection unit 114. The distance between the drone 100 and the subject is calculable according to a known technology.

The subject information acquisition unit 118 calculates position information on a subject (for example, the coordinates of the subject) from information on a calculated distance between the drone 100 and the subject and coordinate information on the drone 100 that is acquired by the GPS 133. The calculated position information on the subject is transmitted to the hand-held camera 200 via the communication unit 132. An information storage unit 119 stores a captured image, information received from the hand-held camera 200, information set by the shooting priority setting unit 135, information on a subject that is a shooting target, and recording information as to whether a subject that is a shooting target has been shot.

Note that conditions for shooting a subject may be set in advance in the drone 100 or may be set by a user via the hand-held camera 200. The conditions for shooting a subject include, for example, the direction of a face (such as a front side and a right side), the ratio of the size of the face to a captured image, and the position of the face in the captured image. In the first embodiment, it is assumed that a subject is shot from a front side. The CPU 130 is capable of calculating the destination coordinates of the drone 100 from set shooting priority, shooting conditions, or the like. The CPU 130 notifies the movement control unit 141 of the calculated destination coordinates and instructs the movement control unit 141 to move the drone 100. Furthermore, the CPU 130 instructs the imaging control unit 116 and the recording unit 115 to perform the shooting and recording of a subject.

The configuration of the hand-held camera 200 will be described with reference to FIG. 1B. The hand-held camera 200 does not automatically perform shooting according to shooting priority unlike the drone 100 but shoots a subject according to a user's operation. The configuration of the hand-held camera 200 is similar to that of the imaging unit 110 of the drone 100. Therefore, the same components will be denoted by the same symbols, and their descriptions about the same processes will be omitted.

An imaging control unit 206 includes a processor that controls processes performed in the hand-held camera 200. A subject detection unit 114 is capable of detecting a subject from an image captured by the hand-held camera 200 and an image captured by the drone 100 that is received via a communication unit 211.

A recording unit 205 records an image or the like captured by the hand-held camera 200 on a recording medium. An information storage unit 209 stores a captured image, information received from the drone 100, information on a subject that is a shooting target, and recording information as to whether a subject that is a shooting target has been shot.

A subject information acquisition unit 208 is capable of acquiring information on a distance between the hand-held camera 200 and a subject, information on the position of the subject, and information on surrounding subjects like the subject information acquisition unit 118 of the drone 100.

A display unit 210 includes a display device such as an LCD (Liquid Crystal Display) and displays a captured image or the like on the display device. Furthermore, the display unit 210 displays an operation user interface or the like for receiving instructions from a user.

The communication unit 211 transmits various information to the drone 100 and receives various information from the drone 100. A GPS 212 measures the position of the hand-held camera 200 and acquires coordinate information (position information). A gyro sensor 213 detects the angular speed of the hand-held camera 200 and detects a change in position.

Figure 2:
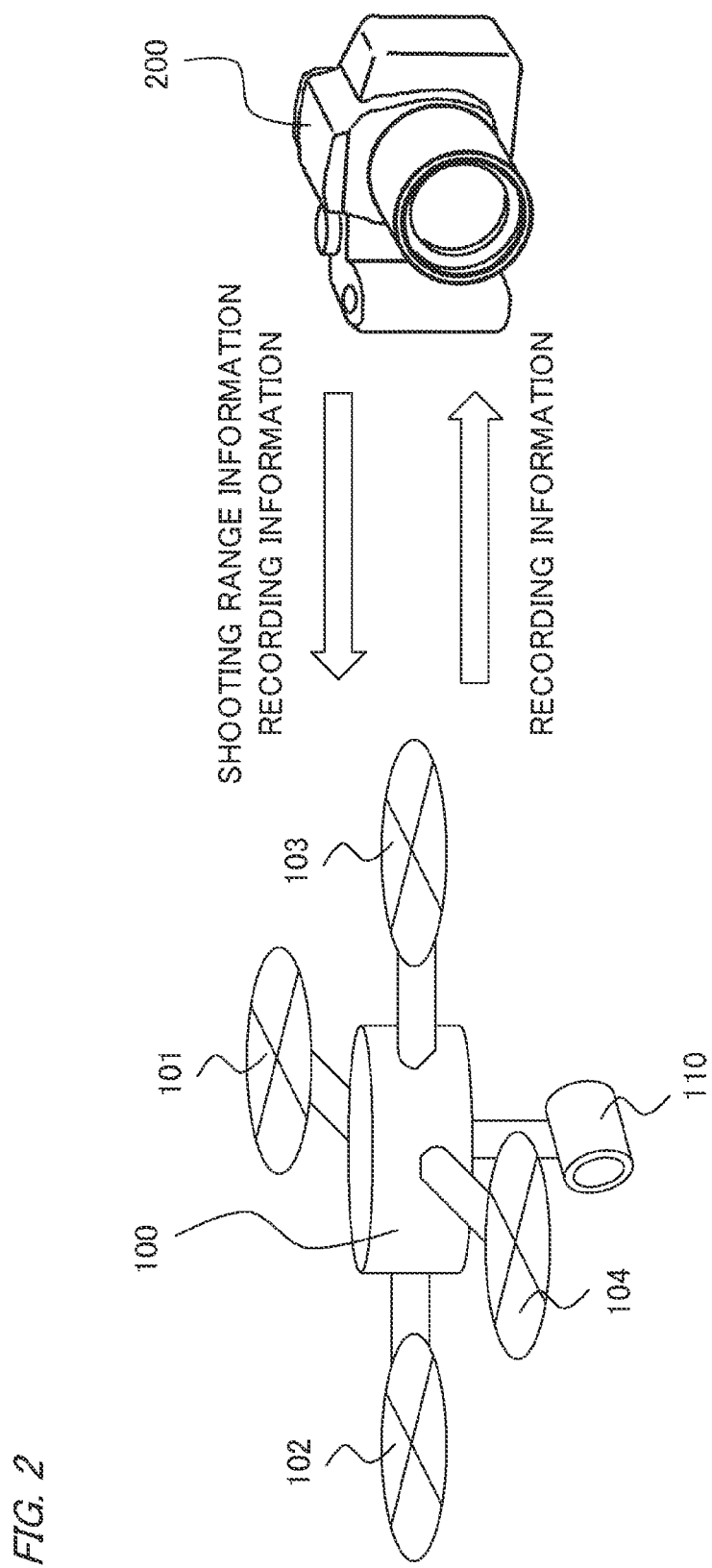
FIG. 2 is a diagram for illustrating information transmitted between the drone and the hand-held camera and information received between the drone and the hand-held camera.

FIG. 2 is a diagram for illustrating information transmitted between a drone and a hand-held camera and information received between the drone and the hand-held camera. The drone 100 and the hand-held camera 200 are capable of transmitting and receiving various information to and from each other via wireless communication such as Wi-Fi.

The hand-held camera 200 transmits shooting range information, recording information on a subject that is captured by the hand-held camera 200, or the like to the drone 100. The shooting range information and the recording information are information for setting shooting priority.

The shooting range information includes information on the shooting position of the hand-held camera 200, information on the shooting range of the drone 100, information on the position of the hand-held camera 200, and information on a shooting region such as a direction in which the hand-held camera 200 is oriented, a sensor size, and a focal-point distance. The position (coordinates) of the hand-held camera 200 is acquirable from information on the GPS 212. The direction in which the hand-held camera 200 is oriented is acquirable from the detection result of the gyro sensor 213. Furthermore, the recording information is information as to whether a shooting target registered in advance has been shot and the shot image has been recorded on the information storage unit 209 or the like by the recording unit 205.

The drone 100 transmits recording information or the like on a subject shot by the drone 100 to the hand-held camera 200. The recording information is information as to whether a shooting target registered in advance has been shot and the shot image has been recorded on the information storage unit 119 or the like by the recording unit 115.

Figure 3A:
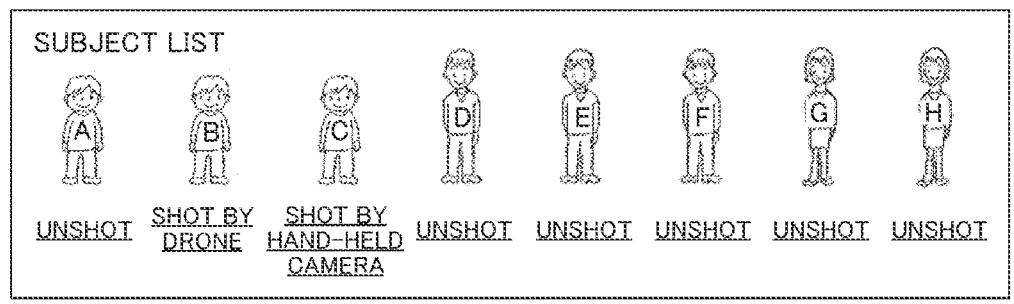
FIGS. 3A and 3B are diagrams for illustrating a display of subject information on the hand-held camera.
Figure 3B:
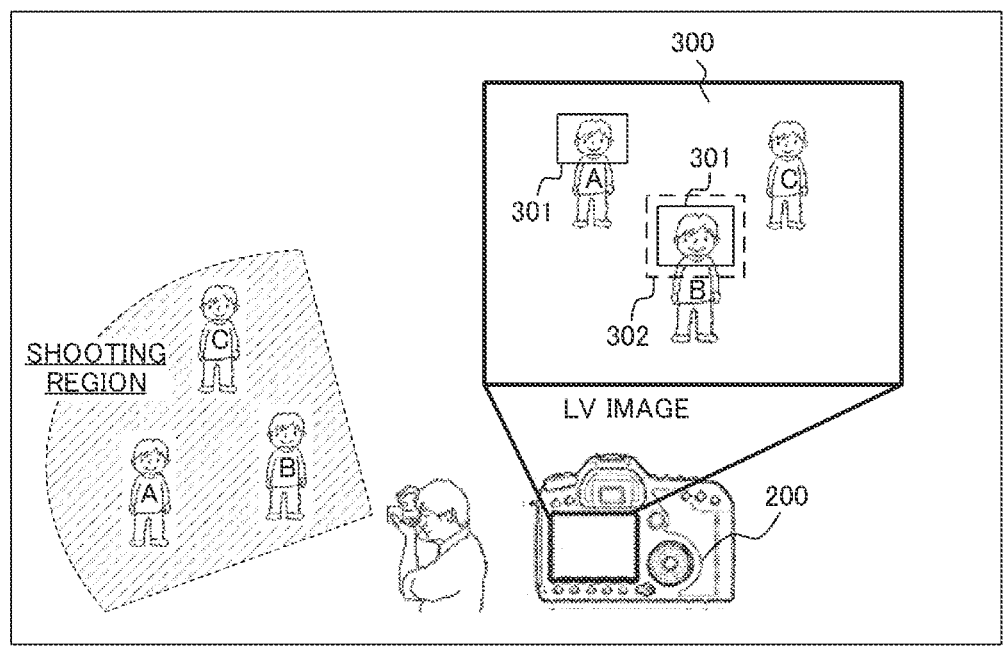

FIGS. 3A and 3B are diagrams for illustrating the display of subject information on the hand-held camera 200. Here, the subject information is information as to whether a subject that is a shooting target has been shot (recorded). The hand-held camera 200 displays an unshot subject among subjects that are shooting targets so as to be discriminable by a user in a live view image (LV image) displayed on the display unit 210 (liquid crystal display screen).

FIG. 3A shows a subject list of images used to discriminate a subject that is a shooting target. The hand-held camera 200 is capable of determining whether a detected subject is a shooting target by comparing the subject detected from a LV image with the subject list. The subject list is registered in advance in the information storage unit 209 of the hand-held camera 200, the information storage unit 119 of the drone 100, or the like. Note that the drone 100 may acquire the subject list from the hand-held camera 200 before starting shooting.

Furthermore, the subject list may be registered in such a manner that an image of a subject that is a shooting target is associated with recording information as to whether shooting has been performed, such as "unshot," "shot by the drone," and "shot by the hand-held camera." When shooting an "unshot" subject, the hand-held camera 200 updates recording information on the subject to "shot by the hand-held camera" in the subject list registered in the information storage unit 209. The hand-held camera 200 transmits the updated recording information to the drone 100. The drone 100 updates recording information on the subject list registered in the information storage unit 119 based on the recording information received from the hand-held camera 200.

Similarly, in a case where shooting an "unshot" subject, the drone 100 updates recording information on the subject to "shot by the drone" in the subject list registered in the information storage unit 119. The drone 100 transmits the updated recording information to the hand-held camera 200. The hand-held camera 200 updates recording information on the subject list registered in the information storage unit 209 based on the recording information received from the drone 100.

FIG. 3B is a diagram for exemplifying a LV image of the hand-held camera 200. The hand-held camera 200 compares a subject detected in a LV image 300 with the subject list shown in FIG. 3A. Using, for example, characteristics such as a body and clothing besides a known face recognition technology, the hand-held camera 200 is capable of comparing a detected subject with a subject included in the subject list. When the detected subject exists in the subject list and has not been shot by the hand-held camera, the hand-held camera 200 displays a solid-line frame 301 around the face of the subject detected in the LV image 300.

Furthermore, in a case where a detected subject exists in the subject list and has been shot by the drone 100, the hand-held camera 200 displays a dashed-line frame 302 around the face of the subject detected in the LV image 300.

In the example of FIG. 3B, subjects A, B, and C exist in a shooting region that is a range in which the hand-held camera 200 is capable of performing shooting. According to the subject list of FIG. 3A, the subject A has been "unshot," the subject B has been "shot by the drone," and the subject C has been "shot by the hand-held camera." Accordingly, the faces of the subjects A and B are surrounded by the solid-line frames 301 since the subjects A and B have not been shot by the hand-held camera 200. Furthermore, the face of the subject B is surrounded also by the dashed-line frame 302 since the subject B has been shot by the drone 100. Since the LV image 300 of the hand-held camera 200 notifies a user of an unshot subject so as to be discriminable as described above, the user is allowed to preferentially search for the unshot subject and shoot the same.

Note that a method for notifying the user of an unshot subject is not limited to the above. For example, the hand-held camera 200 may surround only a subject (the subject A in the example of FIG. 3B) that has not been shot by both the hand-held camera 200 and the drone 100.

Figure 4:
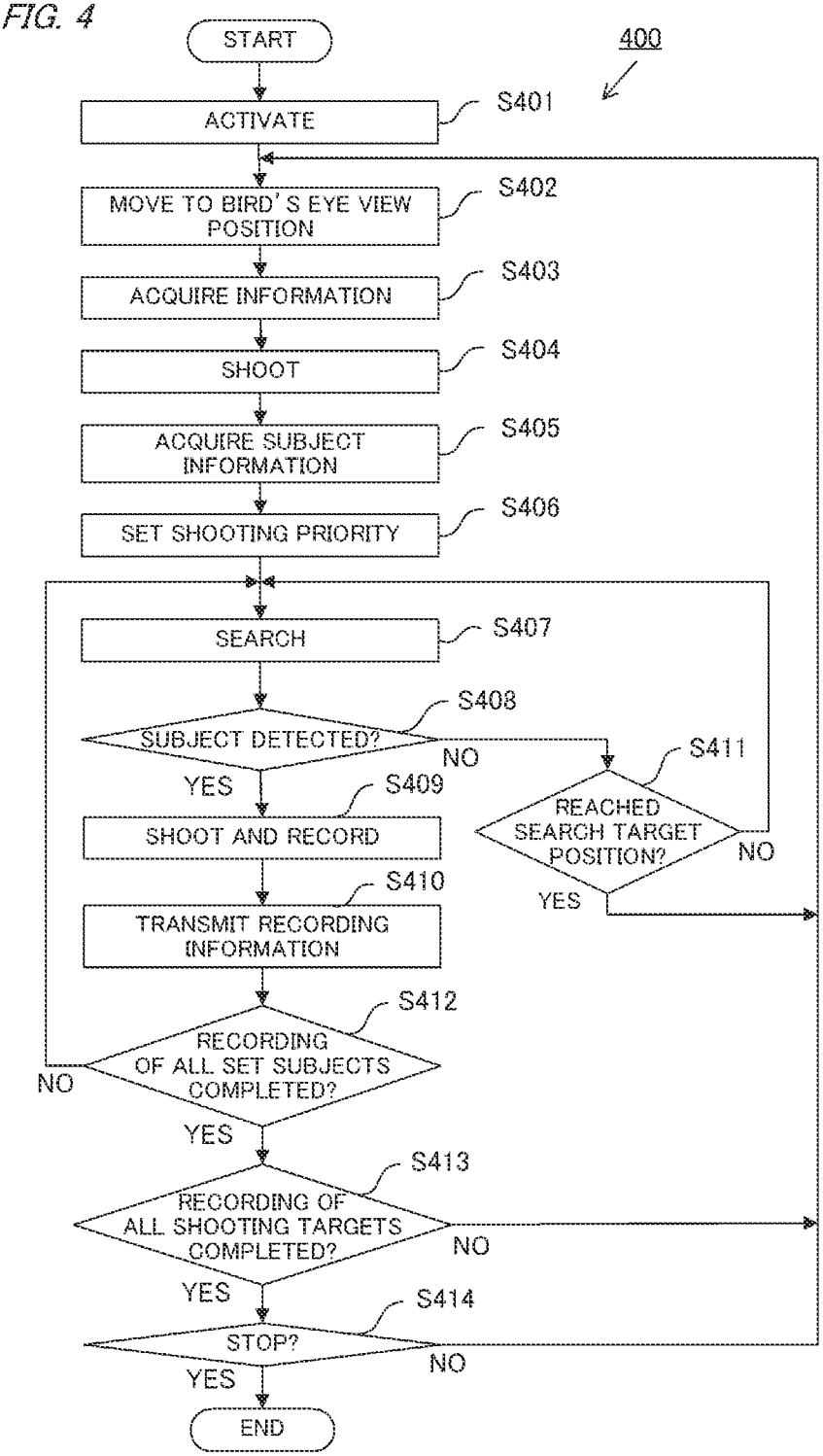
FIG. 4 is a flowchart for exemplifying a shooting process of the drone according to a first embodiment.

FIG. 4 is a flowchart for exemplifying a shooting process 400 of the drone 100 according to the first embodiment. The shooting process 400 shown in FIG. 4 is started, for example, when the hand-held camera 200 is in a power-on state and an instruction for activation is received from a user.

In step S401, the CPU 130 of the drone 100 receives an instruction for activation from a user. The CPU 130 activates the drone 100 and initializes shooting range information and recording information. The shooting range information and the recording information may be information registered in advance in the drone 100, or may be information received from the hand-held camera 200 at the activation. When not receiving the recording information or the like from the hand-held camera 200, the CPU 130 may set respective subjects of a subject list registered in the information storage unit 119 to an unshot state for initialization.

In step S402, the CPU 130 instructs the movement control apparatus 140 to move the drone 100 to a position (hereinafter called a bird's eye view position) at which a bird's eye view of subjects that are shooting targets is made possible. The bird's eye view position is a position at which a bird's eye view of a range regarded as a shooting target by the drone 100 is made possible. The range regarded as the shooting target by the drone 100 is registered in advance or acquirable from the hand-held camera 200. When the movement of the drone 100 is completed, the movement control apparatus 140 notifies the CPU 130 of the completion of the movement.

In step S403, the CPU 130 acquires shooting range information and recording information from the hand-held camera 200 via the communication unit 132. The information received from the hand-held camera 200 corresponds to first information. The CPU 130 calculates the shooting region of the hand-held camera 200 from the shooting range information. The shooting region is calculable from an angle of view estimated from a sensor size and a focal-point distance and the coordinates and the direction of the hand-held camera 200 according to a known method. Note that the drone 100 may search for the hand-held camera 200 and acquire the coordinates and the direction. In this case, the drone 100 is capable of calculating the shooting region of the hand-held camera 200 using the values of the sensor size and the focal-point distance registered in advance.

In step S404, the CPU 130 instructs the imaging control unit 116 to perform shooting at the bird's eye view position. The imaging control unit 116 shoots a bird's eye view image at the bird's eye view position.

In step S405, the CPU 130 instructs the subject detection unit 114 and the subject information acquisition unit 118 to acquire subject information from the bird's eye view image. The subject information corresponds to second information. The subject detection unit 114 detects a subject that is a shooting target from the bird's eye view image shot in step S404 and subject information (subject list) of shooting targets registered in advance. The subject information acquisition unit 118 acquires the position of the subject that is the shooting target detected by the subject detection unit 114, the number of other subjects existing around the subject, and a distance between the drone 100 and the detected subject. Note that the drone 100 is capable of calculating the position of the subject from information on the embedded GPS 133, a distance to the subject, or the like.

The subject information acquisition unit 118 may record subject information such as the positions of subjects acquired from a bird's eye view image on the subject list in association with the respective subjects. The subject information acquisition unit 118 is capable of reducing the load of processes for acquiring subject information by referring to information recorded on the information storage unit 119.

In step S406, the CPU 130 instructs the shooting priority setting unit 135 to set priority for determining the order of shooting the subject that is the shooting target. The shooting priority setting unit 135 sets the shooting priority of the detected subject that is the shooting target based on the position of the subject, the number of other subjects existing around the subject, the shooting region of the hand-held camera 200, the recording information, or the like acquired in step S405.

Figure 5:
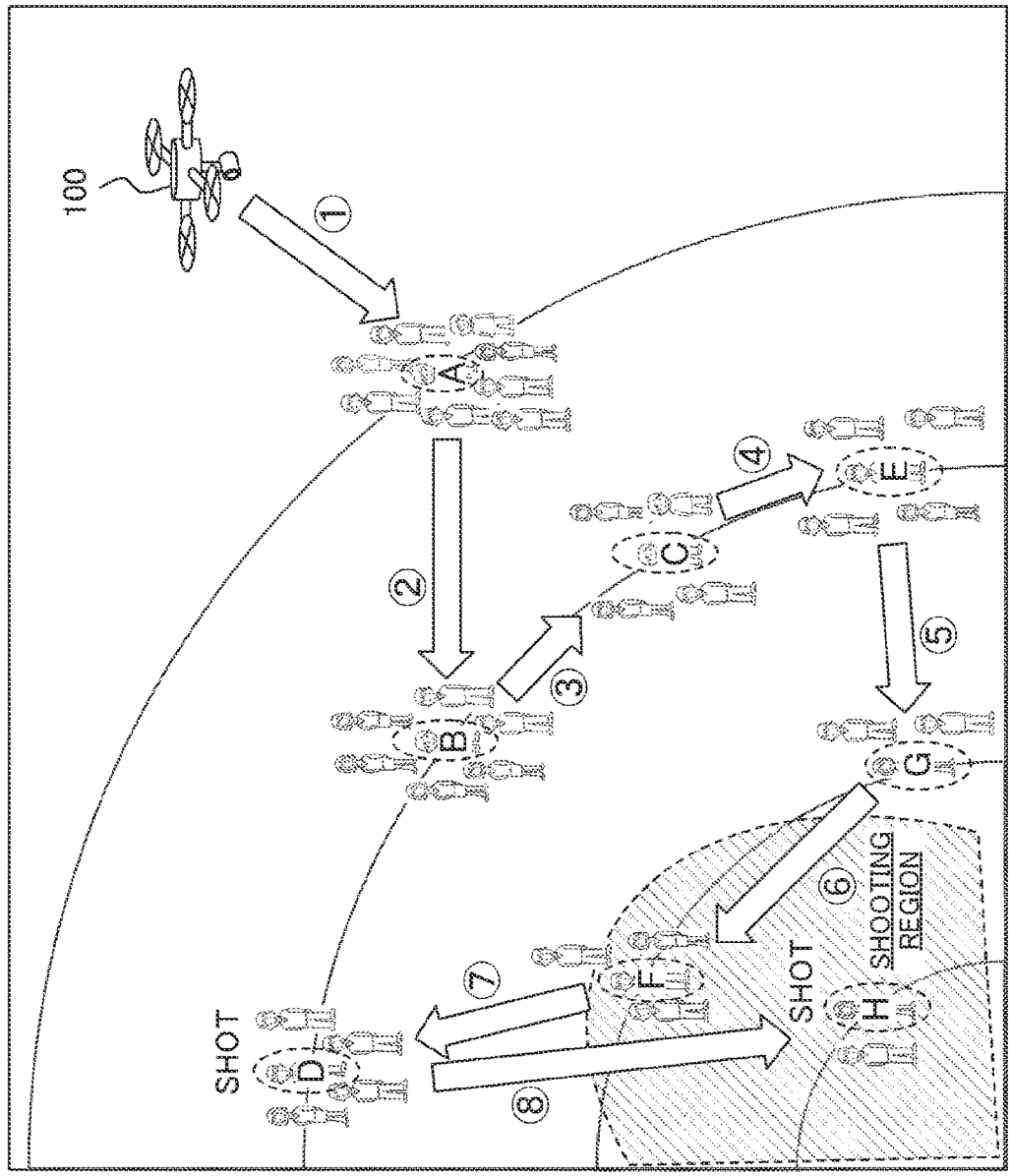
FIG. 5 is a diagram for exemplifying a setting of a shooting priority of subjects.
Figures 6A, 6B:
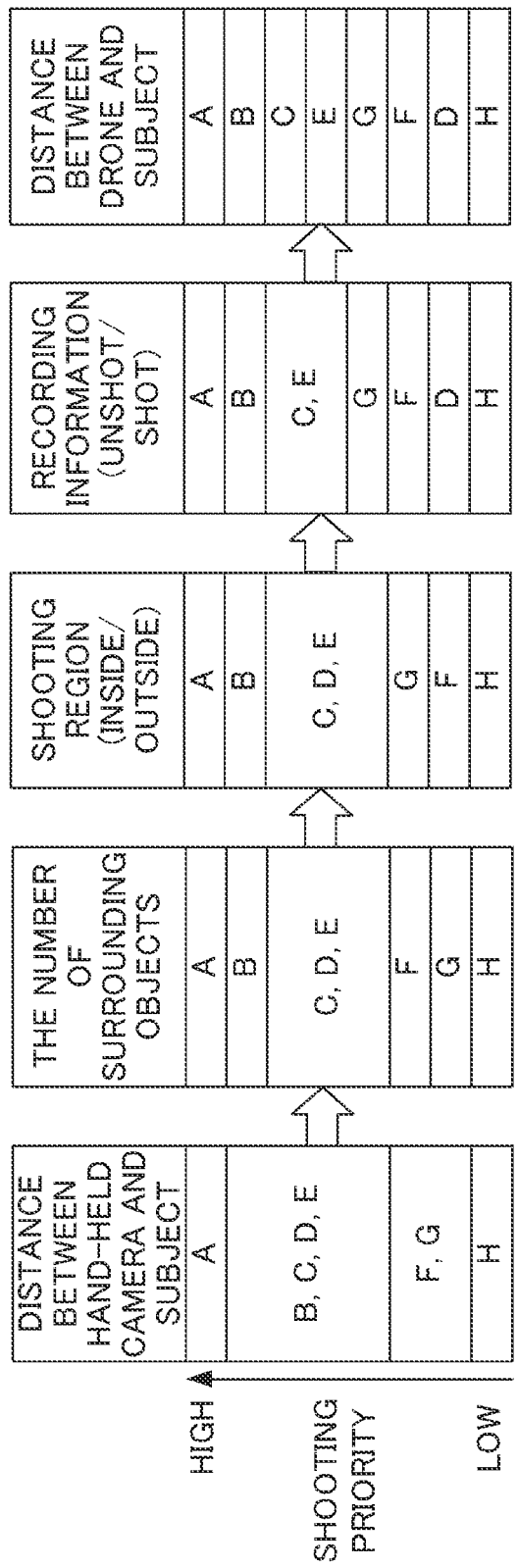
FIGS. 6A and 6B are diagrams for illustrating a method for setting the shooting priority.

Here, the setting of shooting priority will be described with reference to FIGS. 5, 6A, and 6B. FIG. 5 is a diagram for exemplifying the setting of the shooting priority of subjects. FIGS. 6A and 6B are diagrams for illustrating a method for setting the shooting priority. FIG. 5 shows an example in which the shooting priority of the subjects is set according to the method described in FIGS. 6A and 6B.

FIG. 5 shows a bird's eye view image in a range regarded as a shooting target by the drone 100. In the bird's eye view image, eight subjects including subjects A to H are shown. Hereinafter, the subjects A to H will be sometimes represented as the alphabets of A to H. The example of FIG. 5 shows that the shooting priority of the subjects A to H is set in the order of A, B, C, E, G, F, D, and H according to the method described in FIGS. 6A and 6B. That is, the drone 100 moves along a route indicated by arrows with numbers and shoots the subjects.

The method for setting the shooting priority of the subjects will be specifically described with reference to FIGS. 6A and 6B. FIG. 6A shows the method for setting the shooting priority of the subjects A to H according to evaluation results based on five evaluation items. FIG. 6B shows an example of a subject list in which the shooting priority is set.

In the example shown in FIG. 6A, the evaluation items for setting the shooting priority are the following five items.
1. Distances between hand-held camera and subjects
2. The number of surrounding subjects
3. Shooting region (inside/outside)
4. Recording information (unshot/shot)
5. Distances between drone and subjects In FIG. 6A, the shooting priority setting unit 135 evaluates the subjects in order from the evaluation item 1 to the evaluation item 5 to set the shooting priority of the subjects. Note that an order in which the shooting priority setting unit 135 evaluates the subjects with the respective evaluation items to set the shooting priority may be arbitrarily. The shooting priority setting unit 135 may set the shooting priority using a part of the evaluation items.

Evaluation Item 1: Distances Between Hand-Held Camera and Subjects: The evaluation item 1 relates to distances between subjects that are shooting targets and the hand-held camera 200. The shooting priority setting unit 135 calculates distances between the respective subjects and the hand-held camera 200 from the position of the hand-held camera 200 acquired in step S403 and the positions of the subjects detected in step S405. There is a high likelihood that subjects at positions distant from a user who performs shooting with the hand-held camera 200 are not shot. Therefore, the shooting priority setting unit 135 sets higher priority in descending order of the calculated distances between the hand-held camera 200 and the respective subjects.

As shown in FIG. 5, the distances between the hand-held camera 200 and the respective subjects become shorter in order of the subject A, the subjects B, C, D, and E, the subjects F and G, and the subject H. Accordingly, the shooting priority of the respective subjects is set in order of the subject A, the subjects B, C, D, and E, the subjects F and G, and the subject H as shown in FIG. 6A. According to evaluation based on the evaluation item 1, the shooting priority of the subjects B, C, D, and E is set to be the same since the distances between the hand-held camera 200 and the subjects are substantially equal. Similarly, the shooting priority of the subjects F and G is set to be the same.

Evaluation Item 2: the Number of Surrounding Subjects: The evaluation item 2 relates to the number of other subjects around subjects that are shooting targets. The shooting priority setting unit 135 acquires the number of other subjects existing around subjects that are shooting targets. When the neighborhood of subjects that are shooting targets is congested, a user has a difficulty in shooting the subjects at a desired view of angle. Therefore, with respect to subjects set to have the same priority, the shooting priority setting unit 135 sets higher shooting priority in descending order of the number of other subjects existing around the subjects.

As shown in FIG. 5, the number of subjects existing around the subject A is eight, the number of subjects existing around the subject B is six, and the number of subjects existing around the subjects C, D, and E is four. Furthermore, the number of subjects existing around the subject F is three, the number of subjects existing around the subject G is two, and the number of subjects existing around the subject H is one. Accordingly, the shooting priority of the respective subjects is set in order of the subject A, the subject B, the subjects C, D, and E, the subject F, the subject G, and the subject H as shown in FIG. 6A.

Evaluation Item 3: Shooting Region (Outside/Inside): The evaluation item 3 relates to an item for evaluating whether subjects that are shooting targets exist inside the shooting region of the hand-held camera 200 or exist outside the shooting region of the hand-held camera 200. There is a likelihood that subjects existing inside the shooting region of the hand-held camera 200 calculated in step S403 are shot by the hand-held camera 200. Therefore, the shooting priority of the subjects existing inside the shooting region is set to be lower than that of the subjects existing outside the shooting region.

In the example of FIG. 5, the subjects F and H exist inside the shooting region of the camera 200. The other subjects exist outside the shooting region of the camera 200. Accordingly, the shooting priority of the subjects A to E and G existing outside the shooting region is set to be higher than that of the subjects F and H. In this case, shooting priority between the subjects existing inside the shooting region and shooting priority between the subjects existing outside the shooting region remain in the order set in the evaluation items 1 and 2. The shooting priority of the respective subjects after evaluation based on the evaluation item 3 is set in order of the subject A, the subject B, the subjects C, D, E, the subject G, the subject F, and the subject H as shown in FIG. 6A.

Evaluation Item 4: Recording Information (Unshot/Shot): The evaluation item 4 relates to an item for evaluating whether subjects have been shot, that is, whether subjects have been shot by the drone 100 or the hand-held camera 200 and recording information has been recorded on the information storage unit 119. When unshot subjects are not preferentially shot, there is a likelihood that the unshot subjects are not shot within a limited time. Therefore, the shooting priority of subjects that have been shot in recording information stored in the information storage unit 119 is set to be lower than that of subjects that have not been shot.

In the example of FIG. 5, the subjects D and H have been shot. Accordingly, the shooting priority of the subjects D and H is set to be lower than that of the other subjects. In this case, shooting priority between the subjects that have been shot and shooting priority between the subjects that have not been shot remain in the order set in the evaluation items 1 to 3. The shooting priority of the respective subjects after evaluation based on the evaluation item 4 is set in the order of the subject A, the subject B, the subjects C and E, the subject G, the subject F, the subject D, and the subject H as shown in FIG. 6A.

Evaluation Item 5: Distances Between Drone and Subjects: The evaluation item 5 relates to distances between the drone and subjects that are shooting targets. When subjects having the same shooting priority exist after the settings of the evaluation items 1 to 4, the shooting priority setting unit 135 calculates distances between the drone 100 and the respective subjects and sets shooting priority in ascending order of a distance to the drone 100. In the example of FIGS. 5 and 6A, the shooting priority of the subject C is set to be higher than that of the subject E since a distance to the subject C is shorter than a distance to the subject E.

In addition, in a case where subjects having the same shooting priority exist after the settings of the evaluation items 1 to 5, the shooting priority setting unit 135 sets the shooting priority of corresponding subjects in ascending order of IDs. As shown in FIG. 6B, the IDs of subjects are IDs assigned to discriminate subjects that are shooting targets. The IDs of subjects are assigned when subjects that are shooting targets are registered in the subject list.

When shooting priority is set in respective subjects as shown in FIG. 6B, the drone 100 preferentially shoots subjects having higher shooting priority. Note that the setting of shooting priority is not limited to the above method. The shooting priority setting unit 135 may set shooting priority using a part of the respective evaluation items, or may set shooting priority by changing the order of the evaluation based on the respective evaluation items. In addition, the shooting priority setting unit 135 may assign a weight to each of the evaluation items and calculate the evaluation results of respective subjects to set shooting priority instead of applying the respective evaluation items in order as described in FIG. 6A.

In step S407 of FIG. 4, the CPU 130 instructs the movement control apparatus 140 and the subject detection unit 114 to search for a subject that is to be next shot. A subject that is a searching target is a subject having the highest shooting priority other than subjects that have been searched and shot among subjects that are shooting targets. The movement control apparatus 140 moves to the position of the subject that is the searching target. Furthermore, the subject detection unit 114 detects the subject that is the searching target during the movement of the drone 100.

In step S408, the CPU 130 determines whether the subject detection unit 114 has detected the subject that is the searching target. When the subject that is the searching target has been detected (step S408: YES), the shooting process 400 proceeds to step S409. When the subject that is the searching target has not been detected (step S408: NO), the shooting process 400 proceeds to step S411.

In step S409, the CPU 130 instructs the movement control apparatus 140 to move to a shooting position. The shooting position is determined based on the position of the detected subject and shooting conditions set in advance. The shooting conditions include, for example, an angle of view, the ratio of the size of the face of the subject to a captured image, and the position of the face of the subject in the captured image. Furthermore, the CPU 130 instructs the imaging unit 110 to shoot the detected subject and record the shot image and the fact that the subject has been shot on the information storage unit 119. In step S410, the CPU 130 transmits recording information on the subject recorded on the information storage unit 119 to the hand-held camera 200 via the communication unit 132.

In step S411, the CPU 130 determines whether the drone 100 has reached the position of the subject that is the searching target. When the drone 100 has reached the position of the subject that is the searching target (step S411: YES), the shooting process 400 returns to step S402. That is, the CPU 130 causes the drone 100 to move to the bird's eye view position and sets shooting priority again, since the subject that is the searching target has not been found during the movement to the shooting position. Note that the CPU 130 may continue the process using a subject having the second-highest priority as a searching target without returning to step S402.

In step S411, in a case where the drone 100 has not reached the position (for example, the coordinates) of the subject that is the searching target (step S411: NO), the shooting process 400 returns to step S407. That is, the CPU 130 continues search until the drone 100 reaches the position of the subject that is the searching target.

In step S412, the CPU 130 determines whether the recording of all the subjects in which shooting priority is set has been completed. When the recording of all the subjects in which the shooting priority is set has been completed (step S412: YES), the shooting process 400 proceeds to step S413. When the recording of all the subjects in which the shooting priority is set has not been completed (step S412: NO), the shooting process 400 returns to step S407. The CPU 130 searches for a subject having the second-highest shooting priority in step S407 and repeats the processes of steps S408 to S412.

In step S413, the CPU 130 determines whether the recording of all the subjects that are shooting targets has been completed. When the recording of all the subjects that are the shooting targets has been completed (step S413: YES), the shooting process 400 proceeds to step S414. When the recording of all the subjects that are the shooting targets has not been completed (step S413: NO), the shooting process 400 returns to step S402, for example, if any subject of which the subject information has not been acquired in step S405 among the subjects that are the shooting subjects exists. Thus, the processes of steps S402 to S412 is performed.

In step S414, the CPU 130 determines whether the user has issued a stop instruction. When the user has issued the stop instruction (step S414: YES), the shooting process 400 of the drone 100 shown in FIG. 4 ends. In this case, the CPU 130 causes the drone 100 to move to a predetermined standby position or a position instructed by the user.

When the user has not issued the stop instruction (step S414: NO), the shooting process 400 returns to step S402. In this case, the CPU 130 causes the drone 100 to move to another bird's eye view position in step S402, and repeats the processes of steps S403 to S412. Furthermore, in a case where the shooting process 400 returns to step S402 after the recording of all the subjects that are the shooting targets is completed, the CPU 130 is capable of repeating the same processes by setting the respective subjects of the subject list to an unshot state.

In the above first embodiment, the drone 100 preferentially shoots a subject that is not likely to be shot since the subject is located at a position at which shooting by the hand-held camera 200 is difficult. Thus, the user is capable of preventing from failing to shoot a subject that is a shooting target. Furthermore, the drone 100 acquires the state of the hand-held camera 200 and a state around a subject before performing shooting and reflects the same in a shooting order (shooting priority). Therefore, the user is capable of efficiently shooting subjects and comprehensively shooting the same in a short period of time.

Second Embodiment

In a second embodiment, a drone 100 resets shooting priority every time the drone 100 records a subject having the highest shooting priority. Since the configurations of the drone 100 and a hand-held camera 200 in the second embodiment are the same as those of the first embodiment, their descriptions will be omitted.

The second embodiment is applicable to, for example, a case in which the position of the hand-held camera 200 and a shooting scene remarkably change with a lapse of time. Like the first embodiment, the drone 100 sets shooting priority for a subject that is a shooting target and shoots the subject in descending order of the shooting priority. However, when the hand-held camera 200 and a shooting scene change momentarily, shooting priority changes according to the changes. If the drone 100 shoots even a lower subject without resetting shooting priority in a situation in which the hand-held camera 200 and a shooting scene change momentarily, there is a case that the drone 100 loses sight of a subject or is hindered from performing effective cooperation with the hand-held camera 200.

In view of this, the drone 100 resets shooting priority every time the drone 100 records a subject having the highest shooting priority in the second embodiment. Note that the drone 100 may shoot a predetermined number of subjects in descending order of priority and reset shooting priority. For example, the drone 100 may shoot all, a part, or one of subjects depending on the number of the subjects that are shooting targets.

A method for setting the shooting priority of the drone 100 in the second embodiment is the same as that described in the first embodiment using FIGS. 5, 6A, and 6B, its description will be omitted. A shooting process 700 of the drone 100 according to the second embodiment will be described with reference to FIG. 7.

FIG. 7 is a flowchart for exemplifying the shooting process 700 of the drone 100 according to the second embodiment. Among processes included in the shooting process 700, the same processes (steps S401 to S411) as that included in the shooting process 400 shown in FIG. 4 will be denoted by the same symbols, and their descriptions will be omitted. When a subject having the highest shooting priority is shot and recording information is transmitted to the hand-held camera 200 by the processes of steps S401 to S410, the shooting process 700 proceeds from step S410 to step S701.

In step S701, a CPU 130 determines whether the recording of all the subjects that are shooting targets has been completed. When the recording of all the subjects that are the shooting targets has been completed (step S701: YES), the shooting process 700 proceeds to step S702. When the recording of all the subjects that are the shooting targets has not been completed (step S701: NO), the shooting process 700 returns to step S402. When the shooting process 700 returns to step S402, the CPU 130 repeatedly performs processes to reset the shooting priority of a subject and shoot and record a subject having the highest shooting priority.

In step S702, the CPU 130 determines whether a user has issued a stop instruction. When the user has issued the stop instruction (step S702: YES), the shooting process 700 of the drone 100 shown in FIG. 7 ends. In this case, the CPU 130 causes the drone 100 to move to a predetermined standby position or a position instructed by the user.

When the user has not issued the stop instruction (step S702: NO), the shooting process 700 returns to step S402. In this case, the CPU 130 causes the drone 100 to move to another bird's eye view position in step S402, and repeats the process after step S403.

Note that the drone 100 resets shooting priority when shooting a subject having the highest shooting priority in the shooting process 700 shown in FIG. 7, but the shooting priority may be reset in a different way. The drone 100 may reset shooting priority every time the drone 100 shoots a predetermined number of subjects having higher shooting priority.

In the above second embodiment, the drone 100 repeats the setting of shooting priority in a shorter period of time compared with the case of the first embodiment. Therefore, the drone 100 is capable of determining a subject hardly shot by the hand-held camera 200 in real time and reflecting the same in shooting priority. Furthermore, the drone 100 is capable of reflecting a situation change in shooting priority in real time even when a subject moves fast and a shooting scene remarkably changes with a lapse of time. As described above, a user is allowed to realize more efficient cooperation between cameras and prevent from failing to shoot a shooting target.

Third Embodiment

A third embodiment relates to an embodiment in which a subject distant from a hand-held camera 200 is preferentially shot. In a case where a shooting range is wide or even in a case where the hand-held camera 200 has a heavy material and is hard to move, a drone 100 is capable of preventing from failing to shoot a shooting target by preferentially shooting a subject distant from the hand-held camera 200.

Figure 8:
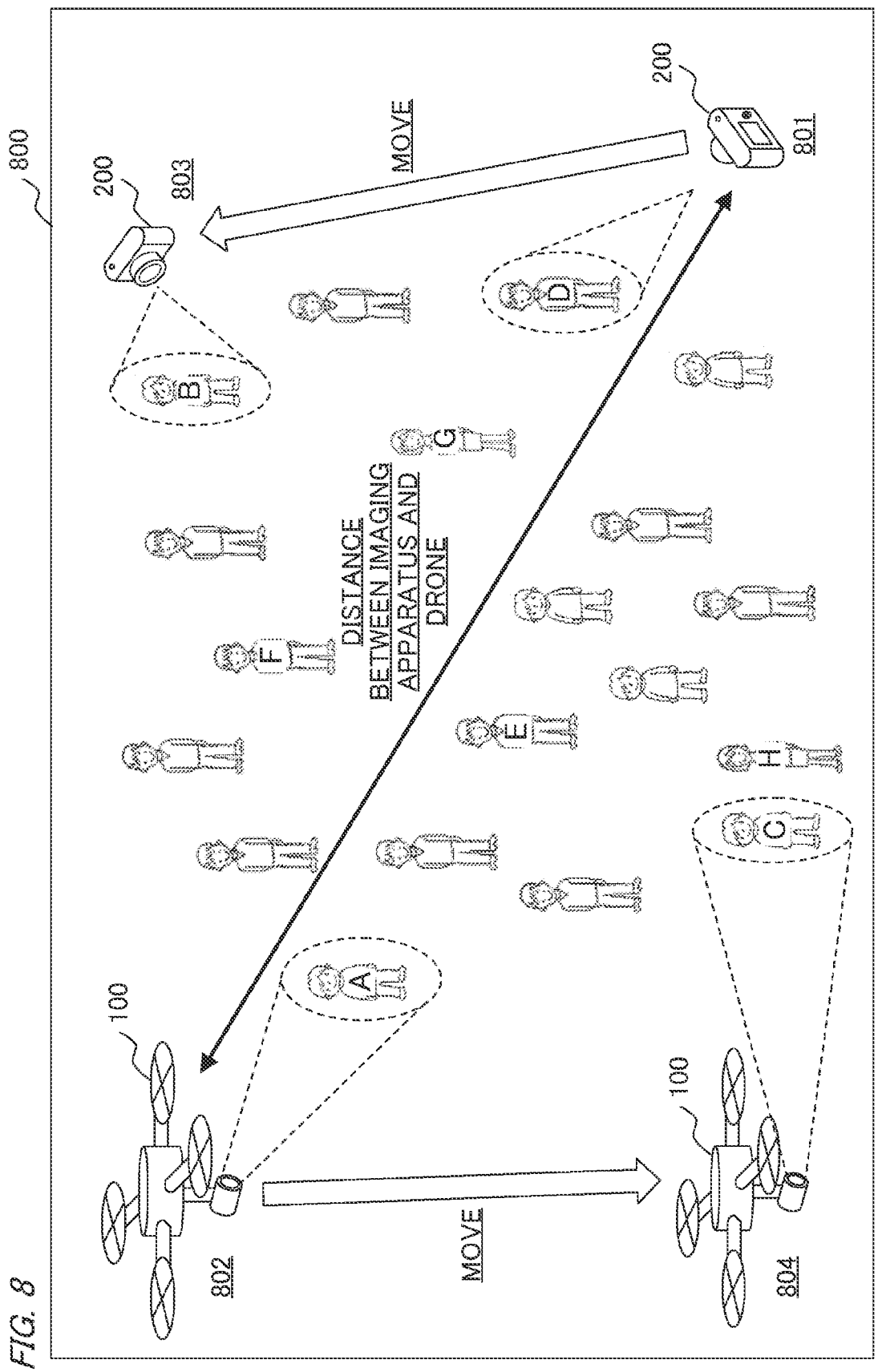
FIG. 8 is a diagram for illustrating a shooting position of a drone according to a third embodiment.

FIG. 8 is a diagram for illustrating the shooting position of the drone 100 according to the third embodiment. A shooting range 800 may be set in advance in the drone 100, or may be acquired from the hand-held camera 200.

The drone 100 acquires position information on the hand-held camera 200, moves to a position most distant from the hand-held camera 200 in the shooting range 800, and is on standby at the position. The drone 100 is capable of moving to a position distant from the hand-held camera 200, for example, by acquiring position information on the hand-held camera 200 at a predetermined time interval. Note that the drone 100 may receive the coordinates of the hand-held camera 200 after movement in a case where the hand-held camera 200 moves.

In the example of FIG. 8, the hand-held camera 200 shoots a subject D at a shooting position 801. The drone 100 moves to a shooting position 802 (standby position) on a diagonally opposite side in the shooting range 800. The drone 100 preferentially detects a subject closer to the drone 100 among subjects A to H that are shooting targets existing inside the shooting range 800. The drone 100 shoots the subject A most distant from the hand-held camera 200 inside the shooting range 800 and records information on the shot subject A on an information storage unit 119.

Furthermore, when the hand-held camera 200 moves to a shooting position 803 and shoots the subject B, the drone 100 moves to a shooting position 804 (standby position). The drone 100 shoots the subject C most distant from the hand-held camera 200 inside the shooting range 800 and records information on the shot subject C on the information storage unit 119. As described above, the drone 100 shoots a subject that is located at a position distant from the hand-held camera 200 and is not likely to be shot. Therefore, a user is allowed to comprehensively shoot subjects that are shooting targets.

FIG. 9 is a flowchart for exemplifying a shooting process 900 of the drone 100 according to the third embodiment. The shooting process 900 shown in FIG. 9 is started, for example, when the hand-held camera 200 is in a power-on state and an instruction for activation is received from a user.

In step S901, a CPU 130 of the drone 100 receives an instruction for activation from the user. In step S902, the CPU 130 acquires position information on the hand-held camera 200 via a communication unit 132. In step S903, the CPU 130 instructs a movement control unit 141 to move the drone 100 to a position (standby position) most distant from the camera 200 inside the shooting range 800. Note that the drone 100 may move to a position distant from the hand-held camera 200 by at least a predetermined distance.

In step S904, the CPU 130 instructs a subject detection unit 114 to search for subjects that are shooting targets registered in advance. Since the drone 100 has moved to the position most distant from the hand-held camera 200 inside the shooting range 800, the drone 100 is capable of detecting a subject most distant from the hand-held camera 200. Note that the drone 100 may shoot a subject most distant from the hand-held camera 200 other than subjects that have been shot.

In step S905, the CPU 130 determines whether any of the subjects that are the shooting targets has been detected. When the subject has been detected (step S905: YES), the shooting process 900 proceeds to step S906. When the subject has not been detected (step S905: NO), the shooting process 900 returns to step S902.

In step S906, the CPU 130 instructs a movement control apparatus 140 to move to a shooting position. The shooting position is determined based on the position of the detected subject and shooting conditions set in advance. The shooting conditions include, for example, an angle of view, the ratio of the size of the face of the subject to a captured image, and the position of the face of the subject in the captured image. Furthermore, the CPU 130 instructs a recording unit 115 to shoot the detected subject and record the shot image and the fact that the subject has been shot on an information storage unit 119.

In step S907, the CPU 130 transmits recording information on the subject recorded on the information storage unit 119 to the hand-held camera 200 via the communication unit 132. In step S908, the CPU 130 excludes the recorded subject from the shooting targets and records the fact that the recorded subject is not a shooting target on the information storage unit 119.

In step S909, the CPU 130 determines whether the recording of all the shooting targets has been completed. When the recording of all the subjects that are the shooting targets has been completed (step S909: YES), the shooting process 900 proceeds to step S910. When the recording of all the subjects that are the shooting targets has not been completed (step S909: NO), the shooting process 900 returns to step S902.

In step S910, the CPU 130 determines whether a user has issued a stop instruction. When the user has issued the stop instruction (step S910: YES), the drone 100 stops its operation and the shooting process 900 shown in FIG. 9 ends. When the user has not issued the stop instruction (step S910: NO), the shooting process 900 proceeds to step S911.

In step S911, the CPU 130 restores the subject that has been excluded from the shooting targets in step S908 to a shooting target again. Then, the shooting process 900 returns to step S902. The processes after step S902 is repeated until the user issues a stop instruction in step S910.

In the above third embodiment, the drone 100 moves to a point distant from the hand-held camera 200 and shoots a subject that is a shooting target. Thus, the drone 100 shoots subjects that are not likely to be shot by the hand-held camera 200, and the user is allowed to comprehensively shoot subjects that are shooting targets.

Fourth Embodiment

The above respective embodiments show examples in which the drone 100 and the hand-held camera 200 perform shooting in cooperation with each other, but imaging apparatuses are not limited to the drone 100 and the hand-held camera 200. The imaging apparatuses are apparatuses that have a communication unit capable of transmitting and receiving data to and from each other and a shooting unit capable of shooting subjects, and that are capable of shooting subjects that are shooting targets in cooperation with each other. Furthermore, the number of the imaging apparatuses that shoot subjects in cooperation with each other is not limited to two, i.e., the drone 100 and the hand-held camera 200. At least three imaging apparatuses may shoot subjects that are shooting targets in cooperation with each other.

Furthermore, it is described in the above embodiments that subjects that are shooting targets are registered in advance, but changes such as addition and deletion may be manually made to the subjects by a user.

Furthermore, shooting conditions under which the drone 100 shoots subjects are not necessarily set in advance in the drone 100. The shooting conditions may be settable by a user via the operation unit of the hand-held camera 200. Furthermore, the drone 100 may acquire shooting conditions set in advance in the hand-held camera 200.

Furthermore, the shooting range or the movement range of the drone 100 may be a range registered in advance, or may be a range in which the drone 100 is capable of communicating with the hand-held camera 200.

Furthermore, an example in which the shooting region of the hand-held camera 200 is calculated by a sensor size, a focal-point distance, coordinates, and a direction is described, but the shooting region may be calculated in a different way. For example, the shooting region of the hand-held camera 200 may be calculated by reflecting the effect of F-value blur.

Furthermore, the evaluation items 1 to 5 are exemplified as evaluation items for setting shooting priority in the first embodiment, but other evaluation items may be used. The shooting priority setting unit 135 may set shooting priority without using a part of evaluation items, or may use new evaluation items based on information acquired from a bird's eye view image in a shooting range or information received from the hand-held camera 200.

Furthermore, the first step of the shooting process is repeated to reset shooting priority in a case where the drone 100 does not detect a subject until moving to the position of the subject that is a searching target. However, the shooting priority may be reset in a different way. For example, the first step of the shooting process is repeated to reset shooting priority in a case where the drone 100 does not detect a subject until a predetermined search time elapses after the start of search.

Furthermore, the drone 100 may receive an image of a subject shot by the hand-held camera 200 together with recording information and determine whether the received image of the subject satisfies a predetermined reference about a size, an angle of view, and blurring. When the predetermined reference is not satisfied, that is, in a case where the hand-held camera 200 fails to perform shooting, the drone 100 may regard the subject as being not shot and set the shooting priority of respective subjects. In addition, when the hand-held camera 200 stops shooting a subject that has not been successfully shot and starts shooting a subject different from the subject, the drone 100 may set the shooting priority of the subject that has not been successfully shot as the highest priority and continue the shooting process. Note that the drone 100 may reset not only the shooting priority of a subject that has not been successfully shot but also the shooting priority of other subjects and continue the shooting process.

Fifth Embodiment

Above-described embodiments can also be realized by a computer of a system or apparatus that reads out and executes computer executable instructions (e.g., one or more programs) stored on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, or the like.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-126318, filed on Jul. 27, 2020, which is hereby incorporated by reference herein in its entirety.

What is claimed is:

1. An imaging apparatus comprising:
a communication unit that receives first information including information on a shooting position of an external apparatus;
a movement unit that moves the imaging apparatus to a position at which a bird's eye view of subjects is made possible;
an imaging unit that performs shooting at the position at which the bird's eye view of the subject is made possible; and
a control unit that (a) acquires second information on the subjects from an image that is shot at the position at which the bird's eye view of the subject is made possible, (b) determines priority for shooting each of the subjects based on the first information and the second information, and (c) controls the movement unit and the imaging unit based on the determined priority;
wherein the communication unit receives position information on the external apparatus, and the control unit determines priority for shooting each of the subjects based on distances between the external apparatus and the subjects.

2. The imaging apparatus according to claim 1, wherein the first information includes at least any of information on a shooting range of the imaging apparatus, information on the subjects, information on a shooting region that is a range for which the external apparatus is capable of performing shooting, and position information on the external apparatus.

3. The imaging apparatus according to claim 1, further comprising a storage unit that stores a captured image of the subjects.

4. The imaging apparatus according to claim 1, wherein the second information includes position information on the subjects detected from a captured image in a shooting range of the imaging apparatus.

5. The imaging apparatus according to claim 1, wherein the second information includes the number of the subjects detected from a captured image of the imaging apparatus.

6. The imaging apparatus according to claim 1, wherein the control unit calculates, using the first information, a shooting region that is a range for which the external apparatus is capable of performing shooting.

7. The imaging apparatus according to claim 1, wherein the control unit determines priority for shooting each of remaining subjects after shooting a predetermined number of subjects having higher priority.

8. The imaging apparatus according to claim 1, further comprising a transmission unit that transmits, to the external apparatus, recording information showing that the subjects have been shot.

9. The imaging apparatus according to claim 1, wherein the movement unit controls at least any of taxiing and an aerial flight.

10. The imaging apparatus according to claim 1, wherein the movement unit moves the imaging apparatus to a position most distant from a position of the external apparatus in a shooting range of the imaging apparatus.

11. An imaging apparatus comprising:
a communication unit that receives first information including information on a shooting position apparatus; apparatus;
a movement unit that moves the imaging apparatus to a position at which a bird's eye view of subjects is made possible;
an imaging unit that performs shooting at the position at which the bird's eye view of the subject is made possible; and
a control unit that (a) acquires second information on the subjects from an image that is shot at the position at which the bird's eye view of the subject is made possible, (b) determines priority for shooting each of the subjects based on the first information and the second information, and (c) controls the movement unit and the imaging unit based on the determined priority,
wherein the control unit sets priority of a first subject to highest, in a case where an image of the first subject shot by the external apparatus does not satisfy a predetermined reference and the external apparatus starts shooting a second subject different from the first subject.

12. A method comprising:
receiving first information including information on a shooting position of an external apparatus;
causing a movement unit of an imaging apparatus to move the imaging apparatus to a position at which a bird's eye view of subjects is made possible;
causing an imaging unit of the imaging apparatus to perform shooting at the position at which the bird's eye view of the subject is made possible;
acquiring second information on the subjects from an image that is shot at the position at which the bird's eye view of the subject is made possible;
determining priority for shooting each of the subjects based on the first information and the second information; and
controlling the movement unit and the imaging unit based on the determined priority;
wherein, in the receiving step, position information on the external apparatus is received, and in the determining step, priority for shooting each of the subjects is determined based on distances between the external apparatus and the subjects.

13. A non-transitory storage medium that stores a program causing a computer to execute a method, the method comprising:
receiving first information including information on a shooting position of an external apparatus;
causing a movement unit of an imaging apparatus to move the imaging apparatus to a position at which a bird's eye view of subjects is made possible;
causing an imaging unit of the imaging apparatus to perform shooting at the position at which the bird's eye view of the subject is made possible;
acquiring second information on the subjects from an image that is shot at the position at which the bird's eye view of the subject is made possible;
determining priority for shooting each of the subjects based on the first information and the second information; and
controlling the movement unit and the imaging unit based on the determined priority;
wherein, in the receiving step, position information on the external apparatus is received, and in the determining step, priority for shooting each of the subjects is determined based on distances between the external apparatus and the subjects.

* * * * *